(No Model.)

D. W. LOCKE.
SHAFT ATTACHMENT.

No. 485,874.  Patented Nov. 8, 1892.

WITNESSES
Chapman Fowler.
Thos Rout jr.

INVENTOR
Daniel W. Locke,
by A. H. Evans & Co.
Attorneys

UNITED STATES PATENT OFFICE.

DANIEL W. LOCKE, OF BUCYRUS, OHIO.

SHAFT ATTACHMENT.

SPECIFICATION forming part of Letters Patent No. 485,874, dated November 8, 1892.

Application filed May 31, 1892. Serial No. 434,979. (No model.)

*To all whom it may concern:*

Be it known that I, DANIEL W. LOCKE, a citizen of the United States, residing at Bucyrus, in the county of Crawford and State of Ohio, have invented certain new and useful Improvements in Shaft Attachments, as set forth in the accompanying drawings, forming part of this specification, in which—

Figure 1:
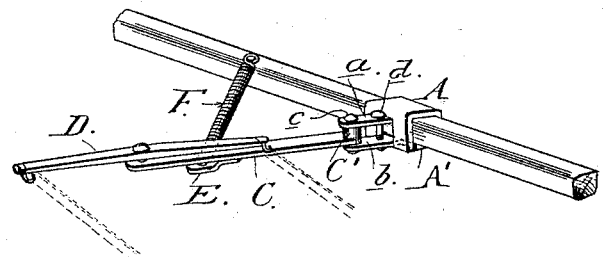
Figure 2:
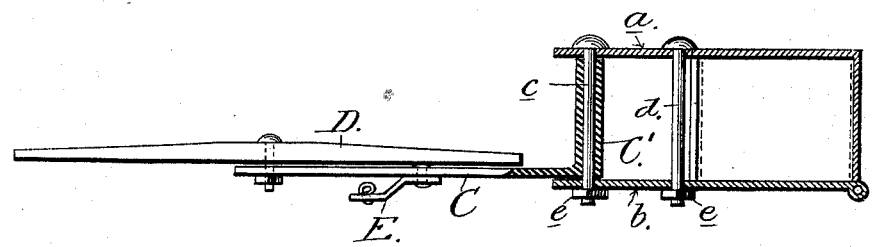

Figure 1 is a perspective view of a shaft attachment embodying my invention. Fig. 2 is a sectional view of the same.

My invention relates to means for breaking young colts to harness by means of attachments applied to vehicle poles or shafts; and my invention consists of the construction and combination of devices, which I shall hereinafter fully describe and claim.

To enable others skilled in the art to which my invention appertains to make and use the same, I will now describe its construction and indicate the manner in which the same is carried out.

In the accompanying drawings, A represents a sleeve, which is adapted to be fitted to and embrace the pole or shaft of a vehicle and is provided with a bottom piece A', hinged at its rear end to the body portion A of the sleeve, whereby said bottom portion may be opened to permit the ready application to or removal from the vehicle pole or shaft of the attachment. From the front central portion of the sleeve a tongue $a$ is struck out and bent in a horizontal plane to project outwardly from the body portion of the sleeve, and at the front end of the hinged bottom is a similar tongue $b$, which lies parallel with the tongue $a$ and is connected therewith by bolts $c$ and $d$, secured by nuts $e$, as shown in Fig. 2. This construction enables the sleeve to be securely clamped to the shaft without the aid of bolts passing through the latter, and its position on said shaft may be adjusted by the loosening of the nuts $e$ and the moving of the sleeve into any position desired.

A horizontal-disposed bar C has its inner end formed or provided with a vertical hollow sleeve or barrel C', which is fitted between the forward ends of the tongues $a$ and $b$ and has the bolt $c$ passing through it and serving as the axis about which the bar may swing in horizontal planes, while at the forward end of the bar C is pivotally secured a singletree D, to which the animal may be hitched in the usual manner. On the under side of the bar C is a clip E, from which an elastic strap or spring F extends to the shaft, so as to exert its contractive force to return the bar C to a normal position when pulled forward by the colt.

The device shown and described is made of few parts, none of which are liable to derangement. It may be applied to either the right or left of the pole or shaft, and may be readily applied and removed without the use of bolts passing through the pole or shaft or any fixed portion of the vehicle.

Having thus described my invention, what I claim as new, and desire to secure by Letters Patent, is—

1. A shaft attachment consisting of a sleeve having a hinged bottom or plate by which it is detachably fitted to the vehicle-shaft, bolts securing the free end of the bottom or plate to the body portion of the sleeve and clamping the sleeve to the pole or shaft, a pivotally-secured bar fitted to said sleeve and provided with a singletree, and an elastic connection from said bar to the vehicle pole or shaft, substantially as herein described.

2. A shaft attachment consisting of a sleeve to embrace the vehicle pole or shaft and having a forwardly-projecting tongue, a bottom or plate hinged at one end to said sleeve and having a forwardly-projecting tongue at its opposite end, the bolts passing through said tongues for clamping the sleeve to the pole or shaft, a horizontal bar having a sleeve or barrel at one end for recieving one of said bolts, whereby the bar turns about said bolts as an axis, a singletree at the forward end of the bar, a clip on said bar, and an elastic connection therefrom to vehicle pole or shaft, substantially as herein described.

DANIEL W. LOCKE.

Witnesses:
WM. T. MCDONALD,
R. W. KERR.